US009230317B2

(12) United States Patent
Yasui et al.

(10) Patent No.: US 9,230,317 B2
(45) Date of Patent: Jan. 5, 2016

(54) INSPECTION METHOD AND INSPECTION APPARATUS

(71) Applicant: NuFlare Technology, Inc., Yokohama (JP)

(72) Inventors: Yoshitaka Yasui, Kanagawa (JP); Ikunao Isomura, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 11 days.

(21) Appl. No.: 14/245,153

(22) Filed: Apr. 4, 2014

(65) Prior Publication Data

US 2014/0307945 A1  Oct. 16, 2014

(30) Foreign Application Priority Data

Apr. 12, 2013 (JP) .................................. 2013-084256

(51) Int. Cl.
*G06K 9/00* (2006.01)
*G06T 7/00* (2006.01)
*G06T 7/60* (2006.01)

(52) U.S. Cl.
CPC ............. *G06T 7/0008* (2013.01); *G06T 7/0044* (2013.01); *G06T 7/60* (2013.01); *G06T 2207/20081* (2013.01); *G06T 2207/30148* (2013.01)

(58) Field of Classification Search
None
See application file for complete search history.

(56) References Cited

U.S. PATENT DOCUMENTS

| 2001/0055415 A1* | 12/2001 | Nozaki | 382/141 |
| 2007/0165938 A1* | 7/2007 | Matsumura et al. | 382/144 |
| 2011/0276935 A1* | 11/2011 | Fouquet et al. | 716/112 |

FOREIGN PATENT DOCUMENTS

| JP | 2002-081914 | 3/2002 |
| JP | 2003-214820 | 7/2003 |

OTHER PUBLICATIONS

U.S. Appl. No. 14/529,297, filed Oct. 31, 2014, Isomura, et al.
U.S. Appl. No. 14/529,358, filed Oct. 31, 2014, Isomura, et al.

* cited by examiner

*Primary Examiner* — Chan Park
*Assistant Examiner* — Elisa Rice
(74) *Attorney, Agent, or Firm* — Oblon, McClelland, Maier & Neustadt, L.L.P.

(57) ABSTRACT

An inspection method and inspection apparatus comprising, acquiring an optical image of a pattern formed in a sample, generating a reference image corresponding to the optical image, comparing the optical image and the reference image using a die-to-database method to detect a defect in the optical image and storing information on the defect; regenerating a reference image by reflecting a dimension distribution of a pattern in the surface of the sample on the reference image, and re-comparing an optical image in which a defect is detected by the comparison using the die-to-database method and the regenerated reference image which corresponds to the optical image using the die-to-database method to detect the defect in the optical image in which the defect has been detected, storing information on the defect when the defect is redetected, and determining that the optical image has no defect.

8 Claims, 6 Drawing Sheets

INSPECTION METHOD AND INSPECTION APPARATUS

CROSS-REFERENCE TO THE RELATED APPLICATION

The entire disclosure of the Japanese Patent Application No. 2013-084256, filed on Apr. 12, 2013 including specification, claims, drawings, and summary, on which the Convention priority of the present application is based, are incorporated herein in their entirety.

FIELD OF THE INVENTION

The present invention relates to an Inspection Method and Inspection Apparatus.

BACKGROUND

With high integration and large capacity of a Large Scale Integration (LSI), a circuit dimension required for a semiconductor element becomes increasingly narrowed. For example, a pattern having a line width of several tens of nanometers is required to be formed in the latest typical logic device.

It is necessary to improve a production yield of the expensive LSI in a production process. In the semiconductor element, during a production process, an original graphic pattern (that is, a mask or a reticle, hereinafter collectively referred to as a mask) in which a circuit pattern is formed is exposed and transferred onto a wafer by a reduction projection exposure apparatus called a stepper or a scanner. A shape defect of a mask pattern can be cited as a large factor that reduces a production yield of the semiconductor element. Recently, the finer the dimensions of an LSI pattern formed on the wafer becomes, the finer the shape defect of the mask pattern becomes. For example, Patent Document 1 discloses an inspection apparatus that can detect the nuisance defect on the mask.

Patent Document 1: Japanese Patent Publication 2003-214820.

Patent Document 2: Japanese Patent Publication 2002-81914.

The conventional mask inspection is aimed at the detection of the shape defect of the pattern, and a defect determination algorithm suitable for the detection of the shape defect of the pattern and a defect recording method are devised. In a mask inspection apparatus, a function of detecting the defect caused by the fluctuation in line width of the pattern is improved in order to meet a challenge of a lack of an LSI production margin caused by the fluctuation in line width. However, in a contemporary mask pattern, the shape defect or the dimension of the defect determined to be the cause of the fluctuation in line width becomes substantially equal to the fluctuation in line width (line width distribution) in the whole surface of the mask. Therefore, the number of detected defects becomes large.

One defect detection technique is a die-to-database comparison method. In the die-to-database comparison method, a reference image generated from design pattern data used in mask production and an optical image of the actual pattern on the mask are compared to each other. Specifically, a differential signal between both image signals is obtained, and it is determined that there is a defect in a portion having a large differential signal. At this time, noise is included in the differential signal according to a formation error of a pattern and a detection error at the time of acquiring an image. Therefore, it is important to select a method of separating the noise from the differential signal, which is generated by a pattern defect in the defect determination, and there is a trade-off in sensitivity of defect detection. In other words, when a threshold of the defect determination is set to be high, the noise is reduced, but there is a concern that the original target defect of the detection is overlooked. On the other hand, when the threshold of the defect determination is set to be low, a pseudo defect due to the noise is detected and thus there is a concern that a shape or a line width having no need for the detection is detected as a defect.

The present invention has been made in view of the above-mentioned problems. Namely, an object of the invention is to provide an inspection method and an inspection apparatus, which is capable of detecting a fine defect, that is, a nuisance defect while reducing a pseudo defect.

Other challenges and advantages of the present invention are apparent from the following description.

SUMMARY OF THE INVENTION

According to one aspect of the present invention, an inspection method comprising, acquiring an optical image of a pattern formed in a sample, generating a reference image corresponding to the optical image, comparing the optical image and the reference image using a die-to-database method to detect a defect in the optical image and storing information on the defect, regenerating a reference image by reflecting a dimension distribution of a pattern in the surface of the sample on the reference image, and re-comparing an optical image in which a defect is detected by the comparison using the die-to-database method and the regenerated reference image which corresponds to the optical image using the die-to-database method to detect the defect in the optical image in which the defect has been detected, storing information on the defect when the defect is redetected, and determining that the optical image has no defect when the defect is not detected from the optical image in which the defect has been detected.

According to one aspect of the present invention, an inspection apparatus comprising, an optical image acquiring circuit configured to acquire an optical image of a pattern formed in a sample, a reference image generating unit configured to generate a reference image corresponding to the optical image, a comparison unit configured to compare the optical image and the reference image using a die-to-database method, and a storage unit configured to store information on a defect of the optical image in which the defect is detected by the comparison unit, wherein the reference image generating unit reflects a dimension distribution of the pattern in the surface of the sample on the reference image to regenerate a reference image, the comparison unit re-compares the optical image in which the defect is detected by the comparison using the die-to-database method and the regenerated reference image which corresponds to the optical image using the die-to-database method, when the defect is redetected from the optical image in which the defect has been detected, information on the defect is stored in the storage unit, and when the defect is not detected from the optical image in which the defect has been detected, the stored information on the defect of the optical image is erased.

DETAILED DESCRIPTION OF THE EMBODIMENT

Figure 1:
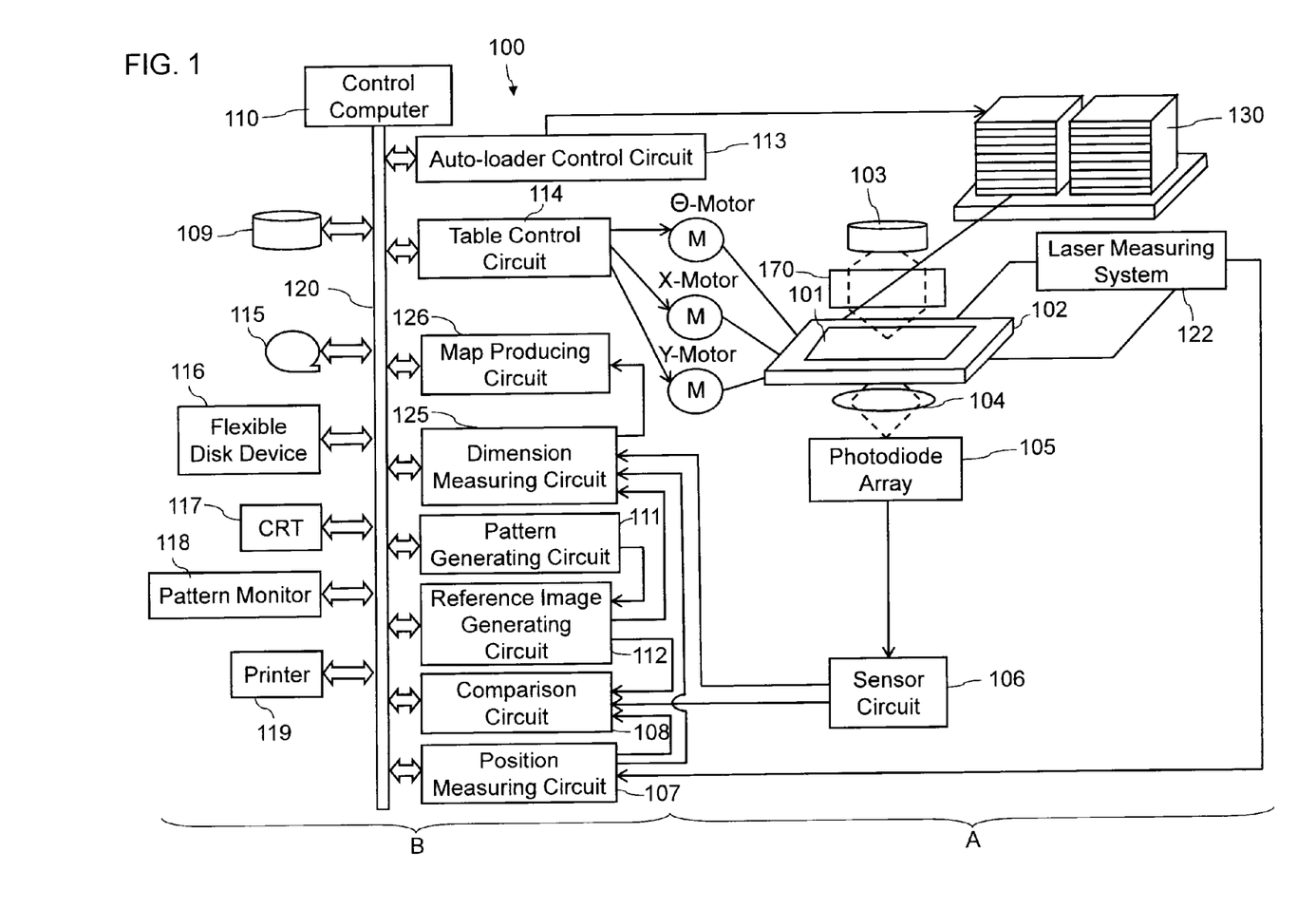
FIG. 1 is a schematic configuration diagram of an inspection apparatus according to the present embodiment.
Figure 2:
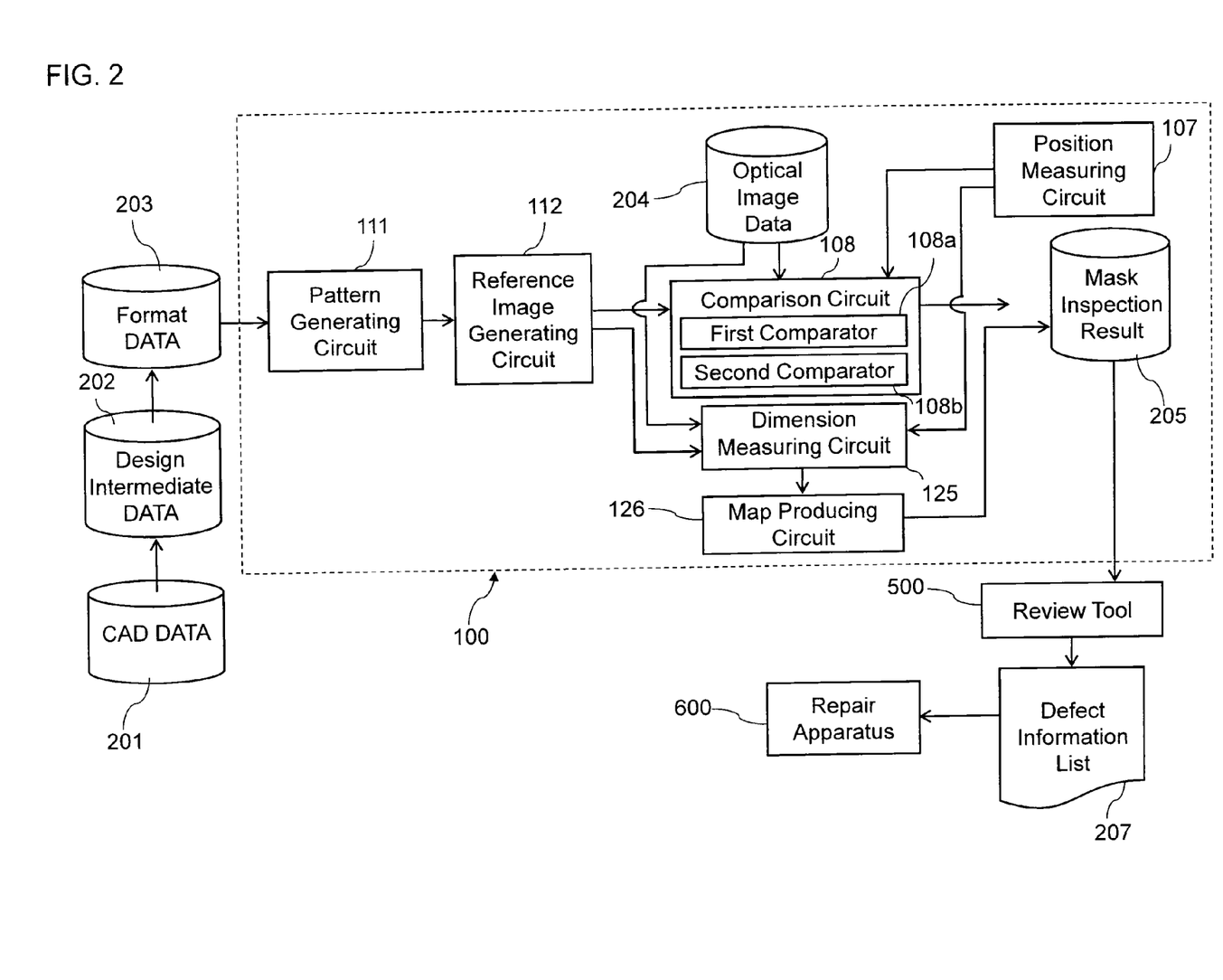
FIG. 2 is a view illustrating a data flow in the inspection apparatus of FIG. 1.

FIG. 1 is a schematic configuration diagram of an inspection apparatus according to the present embodiment. FIG. 2 is a view illustrating a data flow in the inspection apparatus of FIG. 1. In FIGS. 1 and 2, a configuration unit necessary in the present embodiment is illustrated. However, another well-known configuration unit necessary for an inspection may be used. As used herein, a "unit" or "circuit" can be configured by a program operating on a computer. Alternatively, the "unit" or "circuit" may be constructed by not only the program that is software, but also a combination of software, hardware, or firmware. In the case that the "unit" or "circuit" may be constructed by the program, the program can be recorded in a recording device such as a magnetic disk drive.

In the present embodiment, a mask used in photolithography is used as an inspection target. Alternatively, as another example, a wafer may be used as the inspection target.

As illustrated in FIG. 1, an inspection apparatus 100 includes a configuration unit A that constitutes an optical image acquiring circuit and a configuration unit B that performs processing necessary for an inspection using an optical image acquired by the configuration unit A.

The configuration unit A includes a light source 103, an XYθ-table 102 that is movable in a horizontal direction (X-direction and Y-direction) and a rotation direction (θ-direction), an illumination optical system 170 that constitutes a transmission illumination system, a magnification enlarging optical system 104, a photodiode array 105, a sensor circuit 106, a laser length-measuring system 122, and an auto-loader 130.

In the configuration unit A, the optical image 204 of a mask 101 that becomes an inspection target is acquired. The optical image data 204 is an image of a mask in which a graphic pattern is written based on graphic data included in design pattern data of the mask 101. For example, the optical image data 204 is 8-bit data with no code, and expresses a gradation of brightness of each pixel.

The auto-loader 130 locates the mask 101 on the XYθ-table 102. An auto-loader control circuit 113 drives the auto-loader 130 under the control of a control computer 110. When the mask 101 is positioned on the XYθ-table 102, the patterns formed on the mask 101 are irradiated with light from the light source 103 disposed above the XYθ-table 102. More particularly, the mask 101 is irradiated with a light emitted from the light source 103 through the illumination optical system 170. The enlarging optical system 104, the photodiode array 105, and the sensor circuit 106 are disposed below the mask 101. The light transmitted through the mask 101 forms the optical image on the photodiode array 105 through the enlarging optical system 104.

The enlarging optical system 104 may be configured such that a focal point is automatically adjusted by an automatic focusing mechanism (not illustrated). Although not illustrated, the inspection apparatus 100 may irradiate the mask 101 with the light from below and guide the reflected light to the photodiode array through the enlarging optical system. In this case, the optical image of the transmitted light and reflected light can simultaneously be acquired.

The photodiode array 105 performs photoelectric conversion to the pattern image of the mask 101 formed on the photodiode array 105, and the sensor circuit 106 performs A/D (analog-digital) conversion to the pattern image. A sensor (not illustrated) is disposed in the photodiode array 105. A TDI (Time Delay Integration) sensor can be cited as an example of the sensor. In this case, the TDI sensor captures the image of the pattern on the mask 101 while the XYθ-table 102 moves continuously. At this point, the light source 103, the enlarging optical system 104, the photodiode array 105, and the sensor circuit 106 constitute a high-magnification inspection optical system.

In the configuration unit B, the control computer 110, that is, the controller controlling the whole of the inspection apparatus 100 is connected to a position measuring circuit 107, a comparison circuit 108 that includes a first comparator 108a and a second comparator 108b, as an example of a comparison unit a reference circuit 112 that is an example of the reference image producing unit, an expansion circuit 111, a dimension measuring circuit 125 as one example of a measurement acquiring unit that is an example of the dimension difference/dimension ratio acquiring circuit, a map producing circuit 126 that is an example of the dimension distribution acquiring circuit, an auto-loader controller circuit 113, a table control circuit 114, a magnetic disk drive 109, as one example of a storing unit, a magnetic tape device 115, a flexible disk drive 116, a CRT 117, a pattern monitor 118, and a printer 119 through a bus 120 that constitutes a data transmission line. The XYθ-table 102 is driven by an X-axis motor, a Y-axis motor, and a θ-axis motor under the control of the table control circuit 114. For example, an air slider, a linear motor, and a step motor can be used as these driving mechanisms and can further be used in any combination with each other.

As described above, the "unit" or "circuit" in FIG. 1 can be configured as a program operating on the computer. Alternatively, the "unit" or "circuit" may be constructed by not only the program that is software, but also a combination of software, hardware, or firmware. In the case that the "unit" or "circuit" may be constructed by the program, the program can be recorded in the magnetic disk drive 109. For example, each of the auto-loader control circuit 113, the table control circuit 114, the comparison circuit 108, and the position measuring circuit 107 may be constructed by an electric circuit, the software that can be processed by the control computer 110, or the combination of the electric circuit and the software.

The control computer 110 controls the table control circuit 114 to drive the XYθ-table 102. A moving position of the XYθ-table 102 is measured by the laser length-measuring system 122, and transmitted to the position measuring circuit 107.

The control computer 110 controls the auto-loader control circuit 113 to drive the auto-loader 130. The auto-loader 130 automatically conveys the mask 101, notifies an operator of an end of the inspection, reviews a defect as needed, and automatically discharges the mask 101.

The design pattern data that becomes reference data of the die-to-database method is stored in the magnetic disk drive 109. In the progress of the inspection, the design pattern data is read and transmitted to the expansion circuit 111. The design pattern data will be described with reference to FIG. 2.

As illustrated in FIG. 2, CAD data 201 produced by a designer (user) is converted into design intermediate data 202 having a hierarchical format such as OASIS. The design pattern data, which is produced in each layer and formed on the mask, is stored in the design intermediate data 202. At this point, generally the inspection apparatus is configured not to directly read OASIS data. That is, independent format data is used by each manufacturer of an inspection apparatus. For this reason, the OASIS data is input to the inspection apparatus 100 after conversion into format data 203 unique to the inspection apparatus in each layer. In this case, the format data 203 can be set to a data format that is unique to the inspection apparatus 100 or to the data format that is compatible with a drawing apparatus.

The format data 203 is input to the magnetic disk drive 109 in FIG. 1. That is, the design pattern data used during the formation of the pattern on the mask 101 is stored in the magnetic disk drive 109.

In a graphic pattern included in the design pattern, a rectangle or a triangle is used as a basic graphic pattern. For example, Graphic data in which the shape, size, and position of each graphic pattern is stored in the magnetic disk drive 109. For example, the graphic data is information such as a coordinate (x,y) at a reference position of the graphic pattern, a side length, and a graphic code that becomes an identifier identifying a graphic pattern type such as a rectangle and a triangle.

A set of graphic patterns existing within a range of several tens of micrometers is generally called a cluster or a cell, and the data is layered using the cluster or cell. In the cluster or cell, a disposition coordinate and a repetitive amount are defined in the case that various graphic patterns are separately disposed or repetitively disposed with a certain distance. The cluster or cell data is disposed in a strip-shaped region called a stripe. The strip-shaped region has a width of several hundred micrometers and a length of about 100 mm that corresponds to a total length in an X-direction or a Y-direction of the mask 101.

The expansion circuit 111 reads the input design pattern data from the magnetic disk drive 109 through the control computer 110.

In the expansion circuit 111, the design pattern data is converted into image data (bit pattern data). That is, the expansion circuit 111 expands the design pattern data to individual data of each graphic pattern, and interprets the graphic pattern code and graphic pattern dimension, which indicate the graphic pattern shape of the graphic pattern data. The design pattern data is expanded to binary or multi-level image data as the pattern disposed in a square having a unit of a grid of a predetermined quantization dimension. Then an occupancy rate of the graphic pattern in the design pattern is calculated in each region (square) corresponding to a sensor pixel, and the occupancy rate of the graphic pattern in each pixel becomes a pixel value.

The image data converted by the expansion circuit 111 is transmitted to the reference circuit 112, that is, the reference image producing unit, and used to produce a reference image (also referred to as reference data).

The optical image data 204 output from the sensor circuit 106 is transmitted to the comparison circuit 108 together with data indicating a position of the mask 101 on the XYθ-table 102. The data is output from the position measuring circuit 107. The reference image is also transmitted to the comparison circuit 108.

In the comparison circuit 108, the optical image data 204 and the reference data are compared to each other using a proper comparison determination algorithm. In the configuration of FIG. 1, transmission images are compared to each other. In a configuration in which a reflection optical system is used, reflection images are compared to each other, or a comparison determination algorithm in which transmission and reflection are combined is used. As a result of the comparison, in the case that a difference between the two exceeds a predetermined threshold, the position is determined to be the defect.

The stripe is divided into substripes of an appropriate size. Then, a substripe extracted from the optical image data 204 and a substripe extracted from the reference image corresponding to the optical image data 204 are input to a comparison unit of the comparison circuit 108. The input substripes are further divided into small rectangular regions called inspection frames, and the comparison unit performs a comparison process in units of frames to detect the defect. Several tens of comparison units are included in the comparison circuit 108 so as to concurrently process multiple inspection frames. Each comparison unit captures the unprocessed frame image when ending the processing of one inspection frame. Therefore, many inspection frames are sequentially processed.

The processing of the comparison unit is specifically performed as follows. The sensor frame image and the reference frame image are aligned with each other. At this point, in order to align edge positions of the pattern or luminance peak positions, the sensor frame image or the reference frame image is shifted in parallel in units of sensor pixels, and the sensor frame image and the reference frame image are aligned up to the sensor pixel or less by prorating luminance values of neighboring pixels. After the alignment, a level difference between the sensor frame image and the reference frame image is evaluated in each pixel, and derivative values of the pixels in a pattern edge direction are compared to each other, whereby the defect is detected according to the proper comparison algorithm. Hereinafter, occasionally the comparison of the sensor frame image and the reference frame image is simply referred to as comparison of the optical image and the reference image.

In the present embodiment, the optical image data 204 is also transmitted to the dimension measuring circuit 125. The position measuring circuit 107 transmits the data indicating the position of the mask 101 on the XYθ-table 102 to the dimension measuring circuit 125. In the dimension measuring circuit 125, a dimension (critical dimension; hereinafter CD) of the pattern written in the mask 101 is measured from the optical image data 204. For example, in the case of a line pattern, the line width thereof is measured.

The pattern dimension measurement in the dimension measuring circuit 125 is performed concurrently with the acquisition of the optical image of the mask 101. Alternatively, for example, the pattern dimension measurement in the dimension measuring circuit 125 may be performed concurrently with the inspection performed by the first comparator 108a, which will be described later.

The dimension measuring circuit 125 is an example of a dimension acquiring circuit of the invention. In the present embodiment, a space width between the line patterns, namely, an inter-line distance may be measured instead of the line width. The dimensions of both the line width and the inter-line distance may be obtained. Further, the reference data is transmitted from the reference image generating circuit 112 to the dimension measuring circuit 125, and the line width of the pattern corresponding to the line pattern of the optical image is measured. Thus, a dimension difference (ΔCD) or dimension ratio between the pattern line width of the optical image and the pattern line width of the reference image may be obtained. In addition, the dimension difference or dimension ratio of the inter-line distance may be obtained. Alternatively, any combination of the above methods can also be employed.

For example, the pattern in the mask 101 is divided to form multiple inspection regions, and the line width of each pixel is obtained for the optical image of each inspection region. Then, a frequency of the obtained line width is compiled, and an average value of the line widths is calculated from the compiled result of the frequency distribution. Thus, the line width is obtained. In addition, the dimension difference or dimension ratio of the line width can also be obtained from the average value and the line width obtained from the reference image.

The data of the CD, which is obtained by the dimension measuring circuit 125, is transmitted to the map producing circuit 126, that is, the dimension distribution acquiring circuit. In the map producing circuit 126, for example, a map of the dimension (CD map) of the pattern line width in the surface on the mask 101 is produced based on the transmitted data. The produced map is stored in the magnetic disk drive 109. The inspection apparatus 100 does not necessarily include the map producing circuit 126, but the dimension measuring circuit 125 may have the map producing function, or the map may be produced by an external computer, and then input into the inspection apparatus 100. Alternatively, a defect determination may be made by the data of the CD value, which is obtained by the dimension measuring circuit 125, without producing the map.

An example of a method for inspecting the mask 101 with the inspection apparatus 100 in FIG. 1 will be described below.

(Optical Image Acquisition Process)

Figure 3:
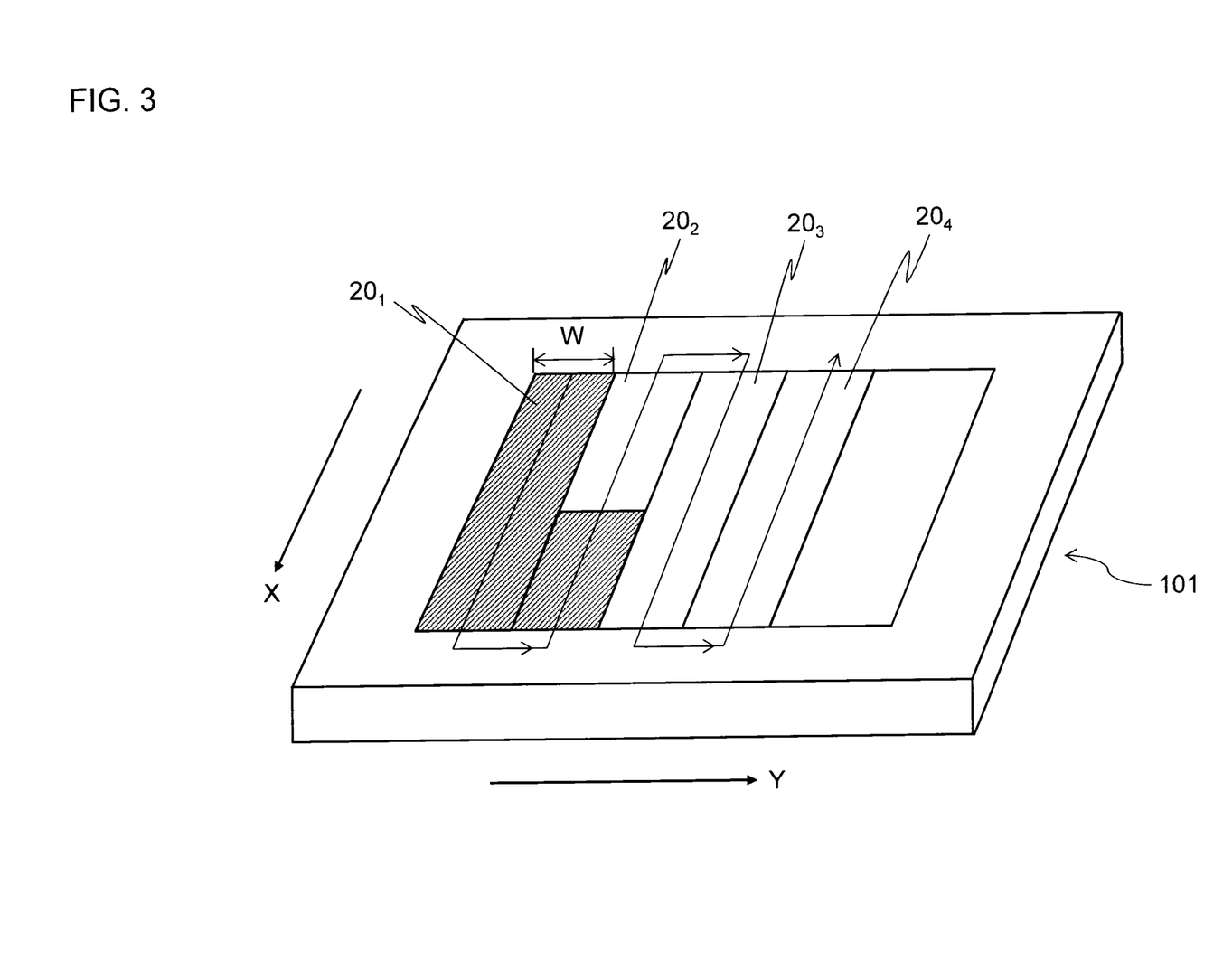
FIG. 3 is a view illustrating a procedure for acquiring an optical image for the detection of the defect of the pattern formed in the mask.

The configuration unit A in FIG. 1 acquires the optical image of the mask 101. FIG. 3 is a view illustrating an optical image acquiring procedure for the purpose of the detection of the defect of the pattern formed in the mask 101. As described above, the optical image corresponds to the optical image data 204 in FIG. 2.

In FIG. 3, it is assumed that the mask 101 is positioned on the XYθ-table 102 in FIG. 1. The inspection region on the mask 101 is virtually divided into the strip-shaped multiple inspection regions, namely, stripes $20_1$, $20_2$, $20_3$, $20_4$, . . . as illustrated in FIG. 3. For example, each stripe is a region having the width of several hundred micrometers and the length of about 100 mm corresponding to the total length in the X-direction or Y-direction of the mask 101.

The optical image is acquired in each stripe. That is, in acquiring the optical image in FIG. 3, the operation of the XYθ-table 102 is controlled such that the each stripe $20_1$, $20_2$, $20_3$, $20_4$, . . . is continuously scanned. Specifically, the optical image on the mask 101 is acquired while the XYθ-table 102 moved in the −X-direction of FIG. 3. The image having a scan width W in FIG. 3 is continuously input to the photodiode array 105 in FIG. 1. That is, the image of the second stripe $20_2$ is acquired after the image of the first stripe $20_1$ is acquired. In this case, after the XYθ-table 102 moves in the −Y-direction in a stepwise manner, the optical image is acquired while the XYθ-table 102 moves in the direction (X-direction) opposite to the direction (−X-direction) in which the image of the first stripe $20_1$ is acquired, and the image having the scan width W is continuously input to the photodiode array 105. In the case that the image of the third stripe $20_3$ is acquired, after moving in the −Y-direction in the stepwise manner, the XYθ-table 102 moves in the direction opposite to the direction (X-direction) in which the image of the second stripe $20_2$ is acquired, namely, the direction (−X-direction) in which the image of the first stripe $20_1$ is acquired. An arrow in FIG. 3 indicates the optical image acquiring direction and sequence, and a hatched portion indicates the region where the optical image is already acquired.

The photodiode array 105 performs the photoelectric conversion to the pattern image formed on the photodiode array 105 in FIG. 1, and the sensor circuit 106 performs the A/D (analog-digital) conversion to the pattern image. Then the optical image is transmitted from the sensor circuit 106 to the comparison circuit 108 in FIG. 1.

The A/D-converted sensor data is input to a digital amplifier (not illustrated) that can adjust an offset and a gain in each pixel. The gain for each pixel of the digital amplifier is fixed in a calibration process. For example, in the calibration process for transmitted light, a black level is fixed while the image of a light-shielding region on the mask 101, sufficiently wide with respect to an area in which the image is captured by the sensor, is captured. Then a white level is fixed while the image of a transmitted light region on the mask 101, sufficiently wide with respect to an area in which the image is captured by the sensor, is captured. At this point, in consideration of a fluctuation in light quantity during the inspection, the offset and the gain are adjusted in each pixel such that amplitudes of the white level and black level are distributed in a range of 10 to 240 corresponding to about 4% to about 94% of 8-bit gradation data.

(Reference Image Generating Process)

1. Storage Process

In the case of inspection by the die-to-database comparison method, the reference image generated from the design pattern data becomes a reference of the defect determination. In the inspection apparatus 100, the design pattern data used to form the pattern on the mask 101 is stored in the magnetic disk drive 109.

2. Pattern Generating Process

In the expansion process, the expansion circuit 111 in FIG. 1 reads the design pattern data from the magnetic disk drive 109 through the control computer 110, and converts the read design pattern data on the mask 101 into the binary or multi-value image data (design image data). The image data is transmitted to the reference circuit 112.

3. Filtering Process

In the filtering process, the reference circuit 112 in FIG. 1 performs the proper filtering to the design pattern data, that is, the graphic image data. The reason is as follows.

In the production process because roundness of the corner and a finished dimension of the line width is adjusted, the pattern on the mask 101 is not strictly matched with the design pattern. The optical image data 204, that is, the optical image obtained from the sensor circuit 106 in FIG. 1 is faint due to a resolution characteristic of the enlarging optical system 104 or an aperture effect of the photodiode array 105, in other words, the state in which a spatial lowpass filter functions.

Therefore, the mask that becomes the inspection target is observed in advance of the inspection, a filter coefficient imitating the production process or a change of an optical system of the inspection apparatus is determined to subject the design pattern data to a two-dimensional digital filter. Thus, the processing of imitating the optical image is performed to the reference image.

The learning process of the filter coefficient may be performed using the pattern of the mask that becomes the reference fixed in the production process or a part of the pattern of the mask (in the present embodiment, mask 101) that becomes the inspection target. In the latter case, the filter coefficient is acquired in consideration of the pattern line width of the region used in the learning process or a finished degree of the roundness of the corner, and reflected in a defect determination criterion of the whole mask.

In the case that the mask that becomes the inspection target is used, advantageously the learning process of the filter coefficient can be performed without removing influences such as a variation of production lot and a fluctuation in condition of the inspection apparatus. However, when the dimension fluctuates in the surface of the mask, the filter coefficient becomes optimum with respect to the position used in the learning process, but the filter coefficient does not necessarily become optimum with respect to other positions, which results in a pseudo defect. Therefore, preferably the learning process is performed around the center of surface of the mask that is hardly influenced by the fluctuation in dimension. Alternatively, the learning process is performed at multiple positions in the surface of the mask, and the average value of the obtained multiple filter coefficients may be used.

(Dimension Measuring Process)

In the dimension measuring process, the pattern dimension (CD) is measured from the optical image. In the inspection apparatus 100 in FIG. 1, the dimension measuring circuit 125 measures the dimension (CD) of the pattern line width using the optical image data 204 output from the sensor circuit 106. At this time, the positional information of the mask 101 on the XYθ-table 102, which is transmitted from the position measuring circuit 107, is added. Further, the dimension (CD) of the pattern may be the line width of the pattern, or may be the inter-line distance of the pattern.

For example, a frequency at which the dimension measuring circuit 125 measures the dimension (CD) during the inspection can be set to the proper number of sampling times (about 1000 points) in the length direction (X-direction) of the stripe ($20_1$, $20_2$, $20_3$, $20_4$, . . . ) in FIG. 3, and set to almost the same number of sampling times in the width direction (Y-direction) of the stripe. A proper line pattern in which a distance of an edge pair can be measured is used in the neighborhood of a potential point where the dimension (CD) is measured. In this case, the one edge pair may be used. However, preferably the dimension (CD) is measured using the edge pairs of multiple positions, the frequency of the obtained value is compiled, and the highest frequency value (mode) of the compiled result of the frequency distribution is used as a representative value. In the case that the edge pair is not found in the neighborhood of the potential point, or in the case of a small number of edge pairs, the dimension (CD) does not need to be measured, or the mode may be obtained from the limited number of samples.

(Map Producing Process)

The dimension measuring circuit 125 measures the pattern dimension (CD), and the obtained data of the pattern dimension (CD) is transmitted to the map producing circuit 126. In the map producing circuit 126, the CD map expressing the dimension distribution in the surface of the mask is produced from the accumulated data of CD values. In the inspection region of the mask 101, a region where the line width of the pattern is narrower and a region where the line width is wider can be easily recognized from the map. For example, when a lithography apparatus used for writing patterns tends to make the line width narrow in a specific portion of the mask, it is possible to recognize such a tendency.

(Die-to-Database Comparison Process 1)

As illustrated in FIG. 2, the optical image data 204 acquired in the optical image acquisition process is transmitted to the comparison circuit 108. The reference image generating circuit 112 transmits the reference data to the comparison circuit 108. The comparison circuit 108 includes the first comparator 108a and the second comparator 108b, and the first comparator 108a compares the optical image data 204 to the reference data by the die-to-database method. Specifically, the captured image of the stripe data is extracted in units of inspection frames. Each of the inspection frames is compared to the data that becomes the reference of the defect determination using a proper comparison determination algorithm. The information on the defect is stored as a mask inspection result 205. For example, the defect coordinate and the optical image and reference image, which are the basis of the defect determination are stored as the mask inspection result 205 in the magnetic disk drive 109 by the control computer 110.

For example, it is assumed that a lattice-shaped chip pattern is formed in the mask 101. In the die-to-database comparison method, when the n-th chip is considered as the inspection target, the n-th chip is determined to be a defect in a case where the pattern difference between the optical image and the reference image of the n-th chip exceeds the predetermined threshold.

More specifically the defect determination can be made by the following two methods. One of the methods is the method for determining that the inspection target is the defect in the case that the difference exceeding a predetermined threshold is recognized between the position of a contour in the reference image and the position of a contour in the optical image. The other method is the method for determining that the inspection target is the defect in the case that the ratio of the pattern line width in the reference image and the pattern line width in the optical image exceeds a predetermined threshold. In this method, the ratio of the inter-pattern distance in the reference image and the inter-pattern distance in the optical image may be used.

(Reference Image Regenerating Process)

In the production process of a mask, a light-blocking film or the like of the lower layer is etched using a resist pattern as a mask, so that a pattern to be transferred onto a wafer is formed. At this time, a difference in areas of the resist film and the light-blocking film in the surface of the mask causes a phenomenon (a loading effect) in that the dimension of the resist pattern is changed from the dimension of the design data. As a result, a distribution in the pattern dimension occurs in the surface of the mask.

In addition, for example, a phenomenon in that the line width is widened in a specific writing area may be found depending on which charge particle beam writing apparatus is used for forming patterns on the mask 101.

As described above, according to the filtering process of the reference image generating process, a local variation in the pattern dimension is understood. Therefore, it is possible to create the reference image imitating the optical image. However, since the dimension distribution in the surface of the mask is widely spread, it is difficult to reflect the dimension distribution on the reference image by the filtering process. On the contrary, since the filtering process is a process of imitating the optical image as a model at a typical pattern position on the design pattern data, the reference image becomes the pattern image having a line width tendency imitating the pattern line width of a region where the learning process is performed. Therefore, in a case where the line width dimension has a distribution in the mask, the optical image and the reference image are compared to each other with a line width bias (deviation) of the pattern in inspecting the region having the pattern line width different from the pattern line width of the region where the learning process is performed. As a result, the shape and line width that do not need the detection is detected as the defect.

In the embodiment, a process (reference image regenerating) of reflecting the dimension distribution of the pattern in the surface of the mask is performed on the reference image corresponding to the optical image of the pattern in which the defect is detected by the first comparator 108a using the CD map. Specifically, the CD map data is transmitted from the map producing circuit 126 to the reference image generating circuit 112, and the reference image generating circuit 112 adjusts the dimension of the pattern based on the CD map.

(Die-to-Database Comparison Process 2)

Next, the optical image in which the defect is detected by the first comparator 108a and the regenerated reference image that corresponds to the optical image are compared by the second comparator 108b of the comparison circuit 108 using the die-to-database method. Herein, since the variation of the dimension in the surface of the mask is reflected on the regenerated reference image, the optical image and the reference image can be compared in a state where the line width bias (deviation) of the pattern is cancelled. As a result of the comparison, when the defect is not detected, it is possible to determine that the defect detected by the first comparator 108a is a pseudo defect and should not have been originally detected as a defect.

In this way, since the reference image on which the CD map is reflected is re-compared, it is possible to perform the die-to-database comparison method in which the influence of the dimension distribution in the surface of the mask is removed. Therefore, the original target defect can be detected while the pseudo defect is reduced.

Figure 4:
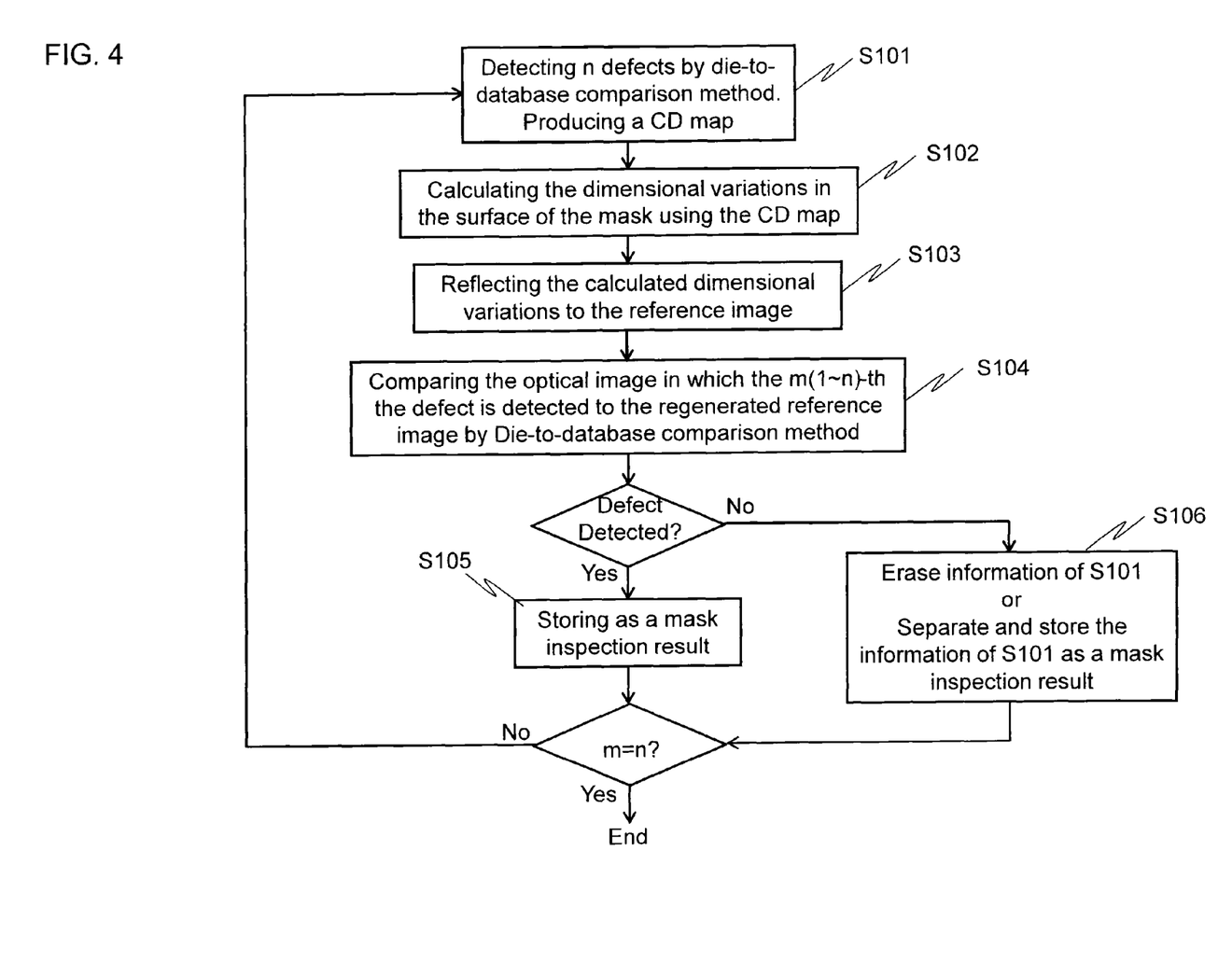
FIG. 4 is a flowchart illustrating a part of an inspection method of the present embodiment.

FIG. 4 is a flowchart illustrating a part of an inspection method of the present embodiment.

In S101, the first comparator 108a of FIG. 2 performs the die-to-database comparison according to the method described above. As a result, it is assumed that n defects (n is an integer of 1 or higher) are detected in the mask 101. The information on the defect is stored as a mask inspection result 205. For example, the defect coordinate and the optical image and reference image, which are the basis of the defect determination are stored as the mask inspection result 205 in the magnetic disk drive 109 by the control computer 110.

At the time of detecting the n defects, the dimension of the pattern is measured from the optical image, and the CD map of the mask 101 is produced on the basis of the measured dimension. Further, as described above, the CD map can be produced in the inspection apparatus 100 of FIG. 1. However, the CD map may also be produced by an external device of the inspection apparatus 100, and input to the inspection apparatus 100.

Next, the variation ($\Delta$CD) of the dimension in the surface of the mask 101 is calculated using the CD map (S102). For example, a region delimited by n inspection frames arranged in the length direction (X-direction) of the stripes (201, 202, 203, 204, . . . ) in FIG. 3 and n inspection frames arranged in the width direction (Y-direction) of the stripes is set as one block (which is a region corresponding to the number of (n×n) inspection frames). The line width per pixel of the optical image in one block is obtained and the frequency of the obtained line width is compiled to calculate an average value of the line widths from the compiled result of the frequency distribution. The dimension difference ($\Delta$CD) of the line width can be obtained from the average value and the line width obtained from the reference image. The variation ($\Delta$CD) of the dimension in the surface of the mask 101 is obtained by similarly obtaining the dimension differences $\Delta$CD in other blocks.

Next, the variation ($\Delta$CD) of the dimension in the surface of the mask that is obtained in S102 is reflected on the reference image (S103). For example, the line width of the reference image is adjusted to be narrowed in the region where the line width is narrowed. On the contrary, the line width of the reference image is adjusted to be widened in the region where the line width is widened. The reference image that is regenerated by being adjusted in dimension as above and the optical image in which the defect is detected at the beginning are re-compared using the die-to-database method (S104). Such a comparison process is performed by the second comparator 108b of FIG. 2.

Further, factors other than the CD map may be added for the reference image regenerating. For example, a predetermined offset is necessarily taken into consideration depending on a length-measuring unit that is used in the dimension measuring process. In another example, in a case where a CD value measured using a length-measuring unit A is used as a reference, an offset obtained from a difference between the dimension measured using the length-measuring unit A and the dimension measured using a length-measuring unit B is added to a CD value measured using the length-measuring unit B. Alternatively, the offset may be added to $\Delta$CD value obtained from the CD map based on the CD value measured using the length-measuring unit B. The dimension of the reference image is adjusted using such an obtained value.

As a result of the re-inspection of S104, when the defect is detected the data is stored as a mask inspection result in S105. For example, the control computer 110 stores the defect coordinates and the optical image, which is the basis of the defect determination, as a mask inspection result 205 in the magnetic disk drive 109. That is, the coordinate of the defect detected by the die-to-database comparison method and the optical image and reference image, which are the basis of the defect determination, are stored as the mask inspection result 205 in the magnetic disk drive 109.

After that, the mask inspection result 205 is transmitted to a review tool 500 as illustrated in FIG. 2. A review process is an operation in which the operator determines whether the detected defect will become a practical problem. For example, the operator visually determines whether the defect needs to be corrected by comparing the reference image, that is the basis for the defect determination, to the optical image including the defect. The defect information determined through the review process is also stored in the magnetic disk drive 109 of FIG. 1. As illustrated in FIG. 2, when the defect to be corrected is confirmed by the review tool 500, the mask 101 is transmitted to a repair apparatus 600, that is, the external device of the inspection apparatus 100 together with a defect information list 207. Because a correction method depends on whether the defect is projected or recessed, a defect type including the distinction between the projection and the recess and the defect coordinate are added to the defect information list 207.

On the other hand, in a case where no defect is detected as a result of the comparison in S104, the control computer 110 determines that the defect detected by the first comparator 108a is not a defect and erases the information that is determined to be a defect in S101 (S106). Alternatively, the control computer 110 can also be configured to store the result of S101 separately from the mask inspection result and to provide the result, so that a user of the inspection apparatus 100 can appropriately read out the result as needed (S106).

Figure 6:
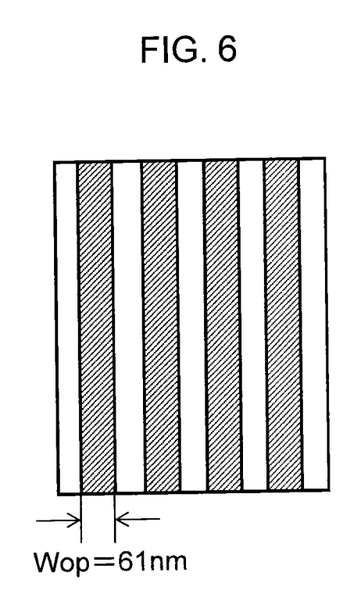
FIG. 6 is a schematic diagram of the optical image corresponding to the inspection frame A in FIG. 5.
Figure 7:
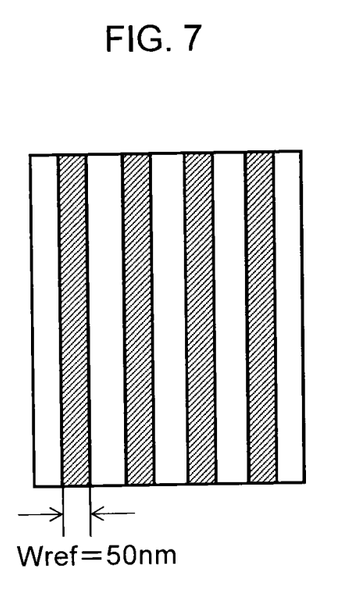
FIG. 7 is a schematic diagram of a reference image corresponding to the optical image in FIG. 6.

For example, it is assumed that a line and space pattern is formed in the mask 101. At this time, it is assumed that the line width (Wop) of the line pattern in a predetermined optical image is 61 nm as illustrated in FIG. 6 and the line width (Wref) of the pattern in the corresponding reference image is 50 nm as illustrated in FIG. 7. Assuming that a threshold of 10 nm is defined and a defect is determined when the dimension difference exceeds 10 nm, since the dimension difference becomes 11 nm, the optical image is determined to be a defect. The information is stored as a mask inspection result.

Figure 5:
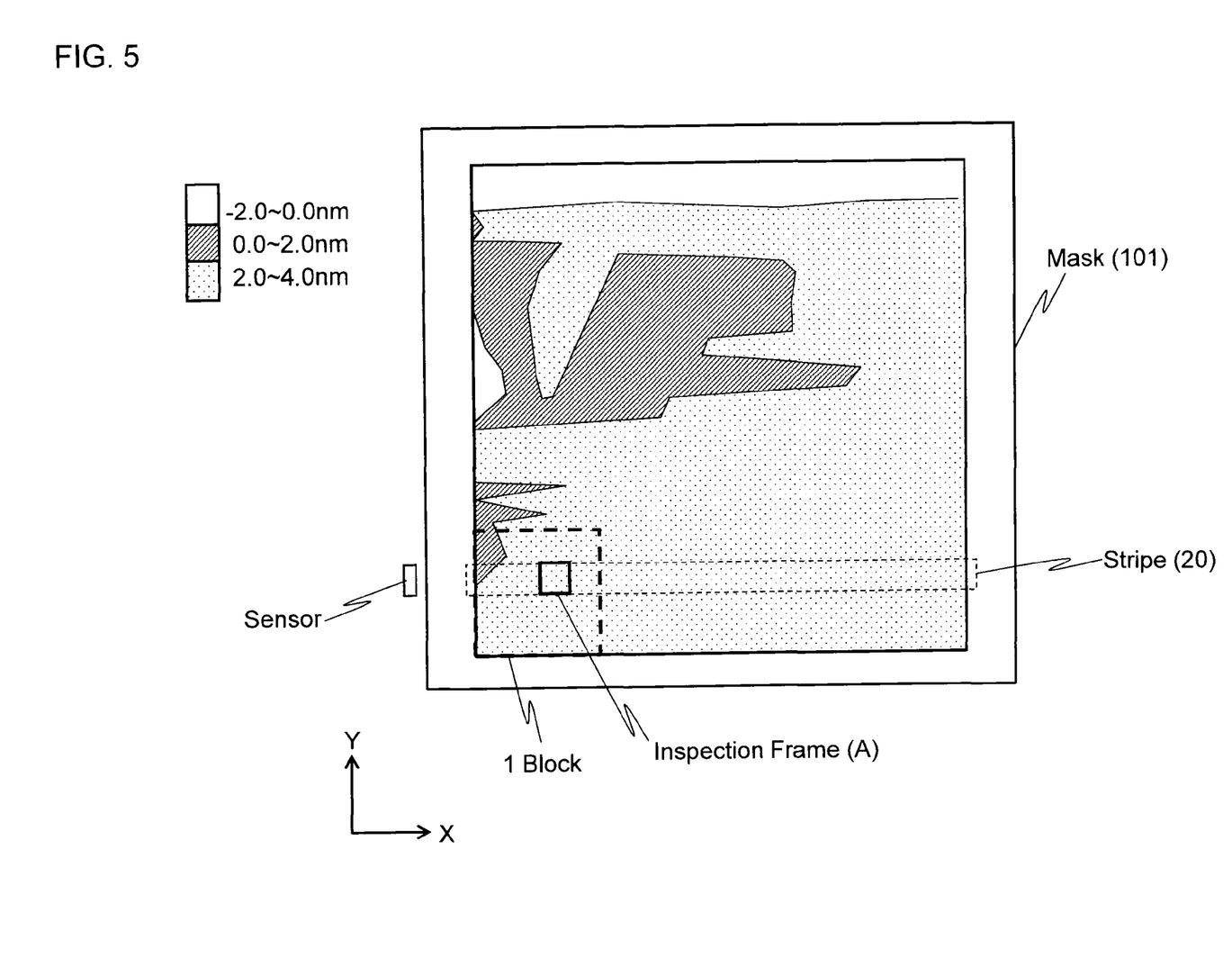
FIG. 5 illustrates an example of a ΔCD map of the pattern in the surface of the mask.

FIG. 5 illustrates an example of a ΔCD map of the pattern in the surface of the mask 101. The optical image of FIG. 6 corresponds to the inspection frame A of FIG. 5. A sensor captures the pattern along the stripe 20. In the comparison circuit 108, the captured image of the stripe data is divided in units of inspection frames, and compared to the corresponding reference image.

Herein, as can be seen from FIG. 5, the pattern in the surface of the mask 101 has a dimension distribution. Then, the inspection frame A is positioned in the region where the line width is wider than a designed value. Therefore, it can be said that the line width of the pattern in the inspection frame A is added with a tendency of the line width distribution in the region. In this case, the dimension is adjusted such that the line width of the reference image is widened.

Figure 8:
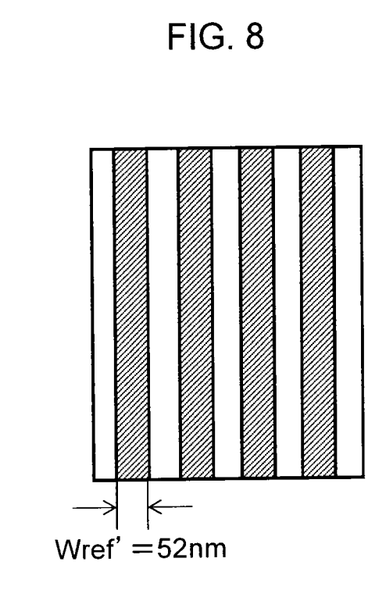
FIG. 8 is a schematic diagram of a reference image that is regenerated.

As described above, when the dimension distribution of the pattern is reflected on the reference image, first, the dimension of the pattern in the optical image is measured, and then the dimension distribution of the pattern in the surface of the mask 101 is obtained from the measured dimension. At this time, the pattern is divided in units of arbitrary block sizes, and the average value of the dimensions of the pattern is calculated for every block so as to obtain the dimension distribution. For example, a region (the region surrounded by a dotted line in FIG. 5) delimited by four inspection frames arranged in the length direction (X-direction) of the stripe 20 in FIG. 5 and four inspection frames arranged in the width direction (Y-direction) of the stripe is set as one block. The line width per pixel of the optical image in one block is obtained, and the frequency of the obtained line width is compiled to calculate an average value of the line widths from the compiled result of the frequency distribution. The dimension difference (ΔCD) of the line width is obtained from the average value and the line width obtained from the reference image, and reflected on the reference image. When ΔCD=2 nm, the line width (Wref') of the pattern in the regenerated reference image becomes 52 nm as illustrated in FIG. 8, and the dimension difference from the optical image becomes equal to or less than 10 nm. Therefore, the optical image has no defect to be detected, and the previously detected defect is determined to be a pseudo defect. Further, the size of one block is not limited to the example described above, and can be set to an arbitrary size.

In the above example, since the information on the defect before the re-inspection, that is, the line width of the pattern in the optical image is 61 nm and the dimension of the pattern in the corresponding reference image is 50 nm, the dimension difference becomes 11 nm, so that the information on the defect determined in the optical image is erased from the mask inspection result. Alternatively, the information may not be erased but stored separately from the information on the defect in the optical image in which the defect is detected through the re-comparison.

Thereafter, the same process is repeated also on the optical image in which the defect is detected in the second time in S101. After the optical image in which the defect is detected in the m-th time is determined whether the information is stored as the mask inspection result through the re-inspection, the control computer 110 determines whether m=n or not. Therefore, it is determined whether the die is the n-th one, that is, the last one in which the defect is detected. When m=n, the re-inspection is assumed to be performed on all the defects, and a series of processes ends.

Further, the order of the n defects for re-inspection according to the processes of FIG. 4 is not limited to the detection order of the defects. For example, the re-inspection may be performed from the final detected defect to the first detected defect. Further, the order may be set in consideration of the efficiency of movement in the XYθ-table 102.

According to the embodiment, the optical image and the reference image that are similar in the dimension distribution are compared by reflecting the dimension distribution in the surface of the mask on the reference image. In other words, since the comparison can be made in a state where the influence caused by the difference in the dimension distribution is minimized, the defect having no need for the detection is removed from the mask inspection result. In other words, it is possible to reduce the pseudo defect without causing a decrease in sensitivity to the defect detection. In addition, since the defect having no need for the detection is removed from the mask inspection result, the number of defects that is reviewed by the operator is decreased and results in shortening of the inspection time. Further, since the number of defects described in the defect information list is also decreased, the production yield of the mask can be improved.

The map produced by the map producing circuit 126 of the present embodiment can be used to transfer the pattern of the mask 101 to the wafer. For example, when the exposure apparatus that transfers the pattern of the mask 101 to the wafer can input irradiation energy (dose) as a map, the map produced by the map producing circuit 126 is input to the exposure apparatus, and converted into the map of the irradiation energy, which allows the line width to be homogeneously transferred to the wafer. For example, in the position where the dimension difference becomes negative in the mask 101, namely, the position where the line width is narrowed, the irradiation energy is adjusted such that the pattern transferred to the wafer is widened. On the other hand, in the position where the dimension difference becomes positive in the mask 101, namely, the position where the line width is widened, the irradiation energy is adjusted such that the pattern transferred to the wafer is narrowed. Therefore, the line width of the pattern transferred to the wafer is homogenized evenly in the mask in which the pattern has the dimension distribution.

The present invention is not limited to the embodiments described and can be implemented in various ways without departing from the spirit of the invention.

For example, in the above embodiment, the comparison circuit 108 includes the first comparator 108a and the second comparator 108b. The first comparator 108a performs initial inspection using the die-to-database comparison method. The second comparator 108b performs the re-inspection using the die-to-database comparison method using the regenerated reference image. However, the comparison circuit does not necessarily include the first comparator and the second comparator. In other words, a sensor frame image extracted from the optical image data and a reference frame image extracted from the reference image may be input to multiple comparison units included in the comparison circuit depending on the situation. Alternatively, a sensor frame image in which the defect is detected and the regenerated reference frame image may be input. In the former case, the initial inspection will be performed, and in the latter case the re-inspection will be performed.

In addition, in the above embodiment, the description has been made about the reference image generating circuit that performs the reference image regenerating, but the reference image regenerating may be performed by a control computer that is a control unit in charge of all the control of the inspection apparatus. In other words, the control computer may receive the CD map data from the map producing circuit and receive the reference data from the reference image generating circuit so as to adjust the dimension of the reference image. Herein, in a case where the reference image regenerating is performed in parallel to the processes such as the acquisition of the optical image, the generating of the reference image, and an inspection by comparing the optical image and the reference image, it is desirable that the reference image be regenerated by the reference image generating circuit which is configured in an electric circuit in order to obtain a high processing speed for the generating of the reference image.

In addition, in the above embodiment, the dimension of the optical image is measured by the dimension measuring circuit 125 of FIG. 1, and the reference image regenerating is performed using the CD map obtained from the dimension. Herein, the dimension distribution in the surface of the mask that becomes the inspection target is reflected on the CD map, but the invention is not limited thereto. For example, the reference image regenerating may be performed using the CD map indicating characteristics of the charge particle beam lithography apparatus used for forming the pattern on the mask, for example, a characteristic that the line width is widened (or narrowed) in a specific writing area. Even in this case, it is possible to obtain the same effect as described above.

The above description of the present embodiment has not specified apparatus constructions, control methods, etc., which are not essential to the description of the invention, since any suitable apparatus construction, control methods, etc. can be employed to implement the invention. Further, the scope of this invention encompasses all support apparatuses employing the elements of the invention and variations thereof, which can be designed by those skilled in the art.

What is claimed is:

1. An inspection method comprising:
   acquiring an optical image of a patterns formed in a sample;
   generating a reference image corresponding to the optical image;
   measuring a dimension of the patterns in the optical image;
   obtaining a dimension distribution of the patterns in a surface of the sample from the dimension of the patterns in the optical image;
   comparing the optical image and the reference image using a die-to-database method to detect a defect in the optical image and storing information on the defect;
   regenerating a reference image by reflecting the dimension distribution of the patterns in the surface of the sample on the regenerated reference image; and
   re-comparing an optical image detected as having a defect by the comparison and the regenerated reference image which corresponds to the optical image detected as having a defect by comparison to redetect the defect in the optical image detected as having a defect by the comparison, storing information on the defect when the defect is redetected, and determining that the optical image detected as having a defect by the comparison has no defect when the defect is not redetected from the optical image detected as having a defect by the comparison,
   wherein the obtaining of the dimension distribution of the patterns in the surface of the sample from the dimension of the patterns in the optical image is a process of calculating an average value of the dimensions of the patterns in units of arbitrary block sizes to obtain the dimension distribution.

2. The inspection method according to claim 1, wherein when the defect is not redetected from the optical image detected as having a defect by the comparison, the stored information on the defect of the optical image detected as having a defect by the comparison is stored separately from the information on the defect of the optical image detected as having a defect by the comparison in which the defect is redetected in the re-comparison.

3. The inspection method according to claim 1, wherein in the regenerating of the reference image, an offset of an apparatus used for measuring the dimension of the patterns in the optical image is reflected in parallel to the dimension distribution of the patterns in the surface of the sample.

4. The inspection apparatus of claim 1, wherein the re-comparing of an optical image detected as having a defect by the comparison and the regenerated reference image is performed by using the die-to-database method.

5. An inspection apparatus comprising:
   a photodiode array configured to acquire an optical image of a patterns formed in a sample;
   a reference image generating circuit configured to generate a reference image corresponding to the optical image;
   a dimension measuring circuit configured to measure a dimension of the patterns in the optical image;
   a map producing circuit configured to obtain a dimension distribution of the patterns in a surface of the sample from the dimension of the patterns in the optical image;
   a comparison circuit configured to compare the optical image and the reference image using a die-to-database method; and
   a storage circuit configured to store information on a defect of an optical image detected as having a defect by the comparison in which the defect is detected by the comparison circuit, wherein
   the reference image generating circuit reflects a dimension distribution of the patterns in the surface of the sample on the reference image to regenerate a reference image,
   the comparison circuit re-compares the optical image detected as having a defect by the comparison detected as having a defect by the comparison and the regenerated reference image which corresponds to the optical image detected as having a defect by the comparison,
   when the defect is redetected from the optical image detected as having a defect by the comparison, information on the redetected defect is stored in the storage circuit, and
   when the defect is not redetected from the optical image detected as having a defect by the comparison, the stored information on the defect of the optical image detected as having a defect by the comparison is erased.

6. The inspection apparatus according to claim 5, wherein the dimension distribution of the patterns in the surface of the sample is input from an external source.

7. The inspection apparatus according to claim 5, wherein the map producing circuit obtains the dimension distribution of the patterns in the surface of the sample by calculating an average value of the dimensions of the patterns in units of arbitrary block sizes to obtain the dimension distribution.

8. The inspection apparatus of claim 5, wherein the comparison circuit re-compares the optical image detected as having a defect by the comparison and the regenerated reference image by a die-to-database comparison.

* * * * *